US006777048B2

(12) United States Patent
Quillen et al.

(10) Patent No.: US 6,777,048 B2
(45) Date of Patent: Aug. 17, 2004

(54) POLYESTER COMPOSITIONS CONTAINING SILICON CARBIDE

(75) Inventors: Donna Rice Quillen, Kingsport, TX (US); Earl Edmondson Howell, Jr., Kingsport, TN (US); Steven Lee Stafford, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 31 days.

(21) Appl. No.: 10/323,058

(22) Filed: Dec. 18, 2002

(65) Prior Publication Data

US 2004/0122150 A1 Jun. 24, 2004

(51) Int. Cl.[7] .......................... B29D 22/00; C08K 3/14; C08K 3/34
(52) U.S. Cl. ................. 428/35.7; 428/34.5; 428/403; 524/492; 524/495; 524/539; 525/437; 525/444; 521/48.5
(58) Field of Search ............................... 428/34.5, 35.7, 428/403; 524/492, 495, 539; 525/437, 444; 521/48.5

(56) References Cited

U.S. PATENT DOCUMENTS

| 5,382,157 A | 1/1995 | Denis et al. |
| 5,514,462 A | 5/1996 | Endo et al. |
| 5,830,544 A | 11/1998 | Kerscher et al. |
| 5,976,450 A | 11/1999 | Mreijen |
| 6,323,271 B1 | 11/2001 | Caldwell et al. |
| 6,427,826 B1 | 8/2002 | Li et al. |
| 2002/0009564 A1 | 1/2002 | Hall et al. |
| 2002/0077405 A1 | 6/2002 | Edwards et al. |
| 2002/0137872 A1 | 9/2002 | Schneider et al. |
| 2002/0145222 A1 | 10/2002 | Carlton et al. |
| 2002/0156157 A1 | 10/2002 | Edwards et al. |
| 2002/0156158 A1 | 10/2002 | Edwards et al. |

FOREIGN PATENT DOCUMENTS

| KR | 9006334 | 8/1990 |
| WO | WO 02/079309 A1 | 10/2002 |

OTHER PUBLICATIONS

Fred W. Billmeyer, Jr.; Principles of Color Technology; 1981; pp 25–66; John Wiley & Sons; New York.

*Primary Examiner*—Samuel A. Acquah
(74) *Attorney, Agent, or Firm*—Dennis V. Carmen; Bernard J. Graves, Jr.

(57) ABSTRACT

A polyester pellet composition, a preform, and a bottle, each comprising a polyester polymer and silicon carbide. A polyester, and in particular a polyethylene terephthalate polyester, bottle containing silicon carbide has a low coefficient of static friction and a low bottle sidewall haze.

85 Claims, 2 Drawing Sheets

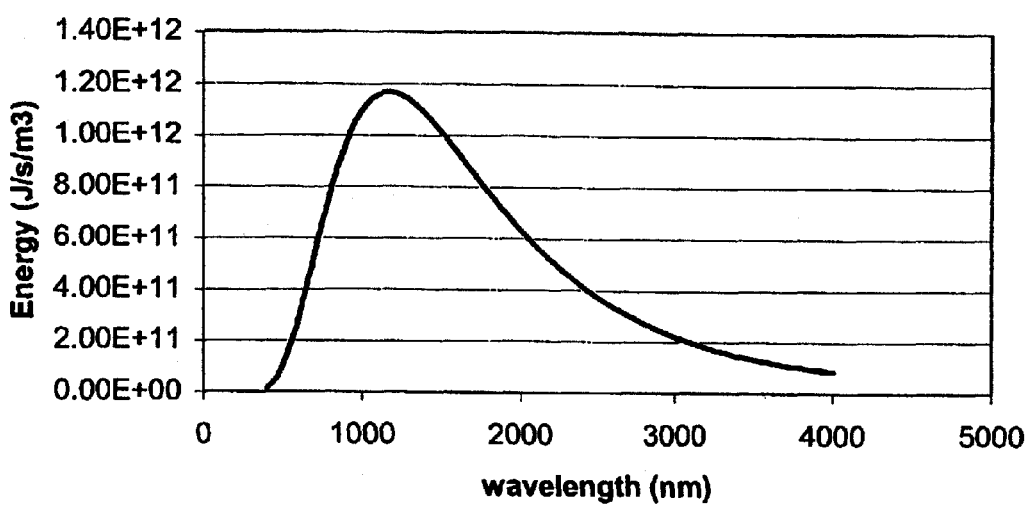

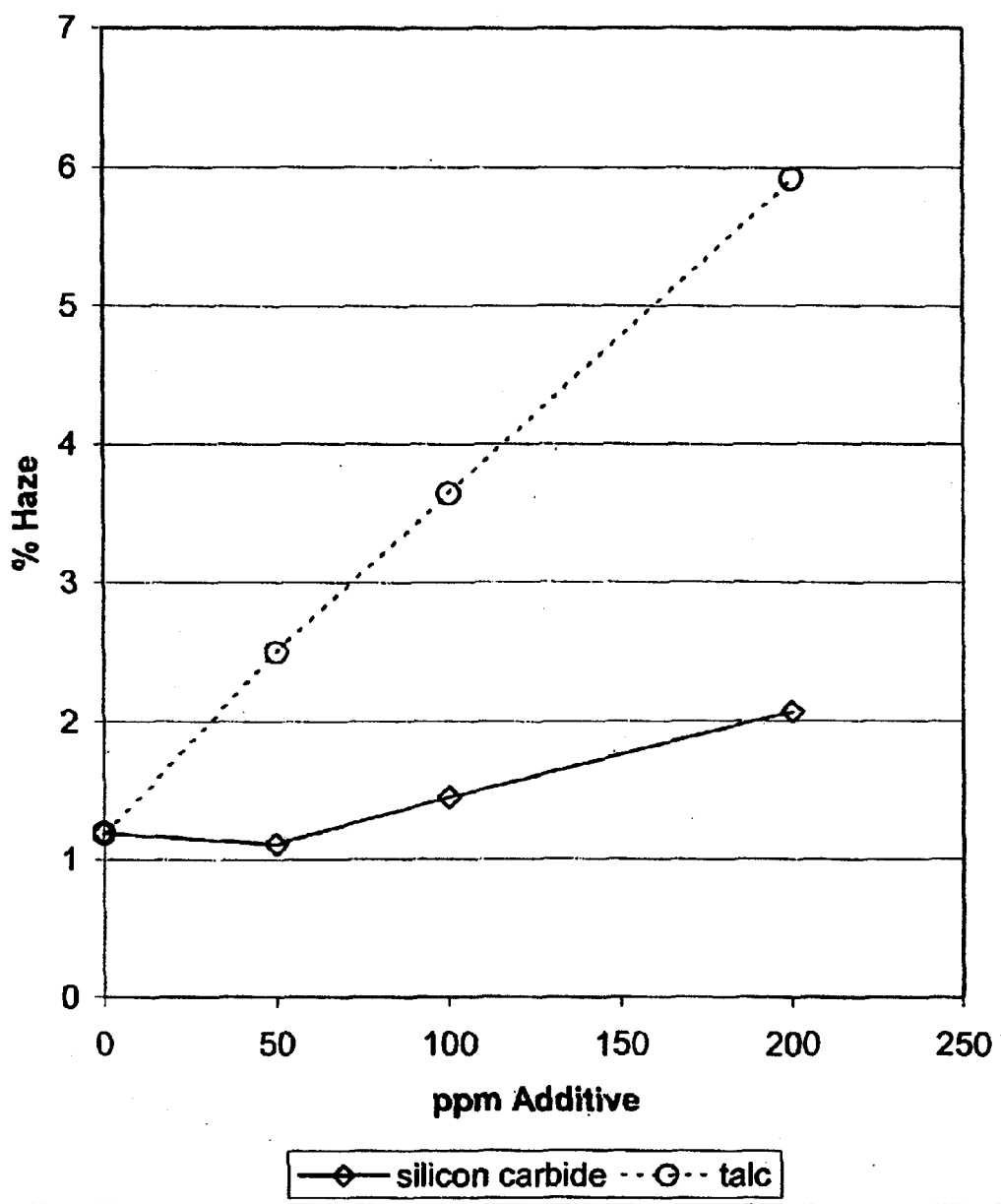

POLYESTER COMPOSITIONS CONTAINING SILICON CARBIDE

FIELD OF THE INVENTION

The invention pertains to polyester compositions and the preforms and bottles molded from the compositions, and more particularly to polyester compositions, preforms, and bottles having a reduced coefficient of friction while maintaining low haze.

BACKGROUND OF THE INVENTION

Problems exist in handling and conveying various types of polyester containers due to the excessive amount of static friction encountered when container surfaces contact each other. The following is a brief description of areas in container packaging industry where problems have been encountered due to excessive coefficient of static friction (COF).

During the process of injection molding preforms, the preforms are often immediately fed into a large box (termed gaylord box) which can hold >1000 preforms. With the high coefficient of friction that is common between PET surfaces, the preforms tend to stack on top of one another in a conical shape (as viewed from the side of the box) instead of sliding past one another and giving more of a flattened out appearance, as would a liquid being poured into a container. As a result, fewer preforms are loaded into a box that leads to higher shipping costs per preform.

The next step for preform processing is the transferal of the preforms from the box into a stretch-blow molding machine feeder bin. In the presence of a high level of friction between preform surfaces, jams can occur in the feeder bin as preforms are loaded onto the feed rail. Feed rail jams can also occur due to this high level of friction between the preform surfaces.

During the process of blowing and filling stretch blow-molded PET, CSD bottles, it is common to convey bottles along conveyor belts or rails, e.g., the moving of bottles from the stretch blow-molding machines to a palletizer area, or depalletizing and moving bottles through a labeling and filling process. At certain points in this process, usually at the palletizing and de-palletizing areas, several rows of bottles may be merged into one row for filling, labeling, palletizing, etc. At this point the pressure between the bottle surfaces is increased. Surfaces that exhibit high COF will resist sliding at the point of bottle merger and lead to bottle sticking and cause line disruption.

Certain bottle types, such as the popular 2-Liter bottles, are straight-walled and have very smooth surfaces obtained from the highly polished mold. Although smooth surfaces provide an appealing appearance, the flat surface maximizes the area of contact between bottles. When PET displays a high coefficient of friction (i.e. static coefficient of friction greater than 1.0), bottles become entangled so as to 'tip over' or just stop moving in the conveying line, causing disruptions in the process, which are very undesirable. The high coefficient of friction prevents adjacent bottles on a multiple-row conveying line from moving (turning or slipping) during conveying. When the conveying line changes direction, sometimes as much as 90 degrees, bottles become entangled and, either stay upright and stop the feed, or, bottles fall over and stop the progression of the line. In either event, someone has to be near these problem areas at all times in order to maintain the progression.

Thus, a method to produce a preform and bottle containing a low static coefficient of friction, which would allow the preforms to slide past one another and allow bottles to slide and rotate against other bottles during this conveying stage of the 'stretch-blow' and 'filling plant' processes, would minimize or eliminate downtime and also the need for someone to constantly monitor the situation.

BRIEF SUMMARY OF THE INVENTION

We have found that silicon carbide imparts to a polyester resin a low coefficient of static friction.

Thus, in one embodiment, there is provided a polyester pellet composition, a preform, and a bottle, each comprising a polyester polymer and silicon carbide.

Preferably, each contain from 5 ppm to 1000 ppm silicon carbide. We have also discovered that a bottle having both a low bottle sidewall haze and a low coefficient of static friction can be made from compositions containing silicon carbide.

In yet other embodiments, there is also provided a process for manufacturing a polyester composition, comprising adding a solid or liquid concentrate comprising silicon carbide and polyethylene terephthalate to bulk polyethylene terephthalate after melt phase polymerization of the bulk polyethylene terephthalate and before or at injection molding the polyester composition.

In yet another embodiment of the invention, there is provided a process for manufacturing a polyester composition, comprising adding silicon carbide neat or as a concentrate or in a carrier to a melt phase for the manufacture of polyethylene terephthalate.

In another embodiment, there is provided a process for manufacturing a polyester composition, comprising adding silicon carbide to a melt phase during the polymerization of polyethylene terephthalate and feeding the molten polyethylene terephthalate to an injection molding machine for the manufacture of a preform.

In a further embodiment, there is provided an isolated concentrate composition comprising silicon carbide in an amount ranging from 0.05 wt. % to about 35 wt. % and a thermoplastic polymer, preferably polyethylene terephthalate, in an amount ranging from at least 65 wt. % up to 99.95 wt. %, each based on the weight of the concentrate composition.

There is also provided a preform and the bottle made from the preform comprising silicon carbide having an L* rating of 75.0 or more, and bottle sidewall haze level of 4.0% or less.

There is also provided a polyester composition, and a preform, and a bottle made from the preform, having a bottle sidewall haze value of 4.0% or less, and a coefficient of static friction of 0.8 or less.

BRIEF DESCRIPTION OF THE DRAWINGS

FIG. 1 is a graph showing the emission spectrum of an ideal black body radiator at 2200° C.

FIG. 2 is a plot showing the effect of additive concentration on bottle sidewall haze.

DETAILED DESCRIPTION OF THE INVENTION

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise. For example, reference to processing a thermoplastic "preform", "article", "container", or "bottle" is intended to include the processing of a plurality of thermoplastic preforms, articles, containers or bottles. References to a composition containing "an" ingredient or "a" polymer is intended to include other ingredients or other polymers, respectively, in addition to the one named.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" is meant that at least the named compound, element, particle, etc must be present in the composition or article, but does not exclude the presence of other compounds, materials, particles, etc, even if the other such compounds, material, particles, etc. have the same function as what is named.

In one embodiment, there is provided a polyester pellet composition, a preform, and a bottle, each comprising a polyester polymer and silicon carbide. In this embodiment, at least one of the additives contained in the thermoplastic composition is silicon carbide, and more preferably silicon carbide particles.

Silicon carbide is characteristically very hard and wear resistant, inert, chemically resistant, high temperature resistant, and has a high thermal conductivity. However, the type, shape, and method for manufacturing the silicon carbide used in the invention is not limited. Any polytype of silicon carbide is suitable. While over 200 polytypes of silicon carbide are known, the most common include 3C, 2H, 6H, and 4H. Silicon carbide may also be doped with impurity atoms such as nitrogen. For example, silicon carbide may be doped with nitrogen by exposing silicon carbide particles and finely divided silicon in a furnace at temperatures ranging from 1000° C. to 1300° C. to form what is commonly known as silicon nitride bonded silicon carbide. Silicon carbide may also be direct sintered (direct sintered silicon carbide) with a non-oxide sintering aid in a inert atmosphere vacuum furnace at temperatures of about 2000° C. to 2200° C. to produce alpha or beta forms having good thermal conductivity and low porosity. Other forms of silicon carbide include reaction bonded silicon nitride by contacting liquid silicon with mixtures of silicon carbide and finely divided carbon; composite bonded silicon nitride, clay bonded silicon nitride, and oxy/nitride silicon carbide, alumina bonded, liquid phase sintered, and recrystallized silicon carbide.

The shape of silicon carbide can be in the form of particles (grains), platelets, fibers, whiskers, and cylinders. The average silicon carbide is preferably shaped as a particle, which may be spherically shaped, oval shaped, star shapes, and any other irregular shaped particles such as found when crushing to a powder.

The particle size of the silicon carbide used in the invention is also not particularly limited. However, in selecting the particle size, consideration should be taken to the effect particle size will have on the brightness of the preforms and the haze values. The preferred average particle size of silicon carbide is at least 0.01 micron, preferably at least 0.4 microns, more preferably at least 1 micron, and suitably up to 400 microns or less, preferably 100 microns or less, more preferably 40 microns or less, most preferably 20 microns or less, and even 12 microns or less. Generally, silicon carbide sizes are provided as a composition having a range of particle sizes with an average particle size within the stated range. The average particle size is represented by the largest number of particles having a particular size within the range. If desired, the particle size can be measured with a laser diffraction type particle size distribution meter.

The particle size distribution of the silicon carbide particles in the polyester polymer is not limited. Silicon carbide particles having a narrow or broad particle size distribution can be used. The particle size distribution curve can be mono or polymodal. Mixtures of different silicon carbide polytypes may be used if desired.

It is desirable to use silicon carbide particles which are free of aggregates in order to avoid the formation of visible specks in the polyester.

The porosity of the silicon carbide is also not particularly limited. However, silicon carbide particles having small surface pore not exceeding 1 micron in largest dimension across the surface of the particles are suitable. Also, silicon carbide compositions having a degree of porosity ranging from 0.0 to 30%, preferably less than 10%, more preferably 5% or less, are also suitable. Nevertheless, silicon carbide particles having surface pores exceeding 1 micron and which are highly porous are also suitable as reheat additives in the thermoplastic composition.

While the characteristics of silicon carbide are not limited, generally, silicon carbide has a bulk density ranging from 2.2 to 3.4 g/cc, a porosity of less than 25%, and even less than 5%, and preferred are those with a high thermal conductivity of at least 80 W/mK. The chemical purity of silicon carbide is not limited. If high purity is desired, however, silicon carbide can be provided in very pure form, e.g. in excess of 99.99% pure silicon carbide. If desired, however, other forms of silicon carbide outside these ranges are also useful.

One type of suitable silicon carbide grade has a face centered cubic beta phase polycrystalline structure having a thermal conductivity of 200–300 W/mK, a grain size ranging from 5 to 10 microns, and a bulk density of 3.0–3.4 g/cc.

A particular advantage of the silicon carbide is that it will effectively lower the coefficient of static friction of the preforms and bottles to less than 0.6 without raising the bottle sidewall haze of the composition beyond 4.0% within a wide loading window. Other black colored additives such as graphite, carbon black, black iron oxide used in polyester compositions for improving the reheat rate of a preform either do not function to reduce COF of blown bottles or if added in quantities typically seen to reduce the COF (e.g. 60 ppm to 150 ppm), the haze level and the L* rating would be unacceptable for many applications. Thus, the amount of silicon carbide which may be used is not restricted to the low levels of 10 to 30 ppm as in the case of carbon black or graphite.

The amount of silicon carbide in the polyester pellet composition will depend upon the particular application, the level of decrease in COF desired, and the toleration to haze for the application. In one embodiment, the quantity of silicon carbide in the polyester pellet composition, a preform, and a polyester bottle is at least 5 ppm, preferably at least 25 ppm, more preferably at least 50 ppm, and most preferably at least 80 ppm. While 250 ppm or less of silicon carbide will achieve the desired reduction in coefficient of static friction while maintaining good haze levels, greater amounts, such as 400 ppm can be used if desired. Applications which do not have stringent clarity requirements can support up to 500 ppm, and even up to 1000 ppm silicon carbide.

The polyester pellet composition of the invention is isolated as a solid at 25° C. and 1 atm in order for ease of transport and processing. The shape of the polyester pellet is not limited, and is typified by regular or irregular shaped discrete particles and may be distinguished from a sheet, film or fiber.

Silicon carbide may be disposed anywhere on or within the polyester polymer, preform, or bottle. Preferably, the polyester polymer in the polyester pellet composition forms a continuous phase within which is distributed silicon carbide. By being distributed "within" the continuous phase is meant that the silicon carbide is found at least within a portion of a cross-sectional cut of the thermoplastic composition as opposed to being disposed only on a surface as would normally be expected for a coating. In the preferable embodiment, silicon carbide may be disposed on the surface of the thermoplastic polymer provided that particles are found in a region other than the surface of the polymer.

Silicon carbide may be distributed within the thermoplastic polymer randomly, dispersed throughout randomly, distributed within discrete regions, distributed only within a portion of the thermoplastic polymer, or disposed on the surface. Preferably, silicon carbide is randomly distributed within the polymer continuous phase, and more preferably the distribution is random.

The polyester polymer is any thermoplastic polyester polymer, particularly a partially aromatic polyester, especially a polyester mainly derived from an aromatic diacid and an aliphatic diol. The preferred polyester polymer is polyethylene terephthalate. As used herein, polyethylene terephthalate means a polymer having ethylene terephthalate units in an amount of at least 60 mole % based on the total moles of units in the polymer. Preferably, the polymer contains ethylene terephthalate units in an amount of at least 85 mole %, more preferably at least 90 mole %, and most preferably at least 92 mole %, as measured by the mole % of ingredients added to the reaction mixture. Thus, a polyethylene terephthalate polymer may comprise a copolyester of ethylene terephthalate units and other units derived from an alkylene glycol or aryl glycol with a aliphatic or aryl dicarboxylic acid.

Polyethylene terephthalate can be manufactured by reacting a diacid or diester component comprising at least 60 mole % terephthalic acid or $C_1$–$C_4$ dialkylterephthalate, preferably at least 70 mole %, more preferably at least 85 mole %, even more preferably, at least 90 mole %, and for many applications will be at least 95 mole %, and a diol component comprising at least 60 mole % ethylene glycol, preferably at least 70 mole %, more preferably at least 85 mole %, even more preferably at least 90 mole %, and for many applications, will be at least 95 mole %. It is also preferable that the diacid component is terephthalic acid and the diol component is ethylene glycol. The mole percentage for all of the diacid component totals 100 mole %, and the mole percentage for all of the diol component totals 100 mole %.

In one embodiment, the polyester pellet composition may be formed by admixing polyester polymers with other thermoplastic polymers, such as polycarbonate (PC) and polyamides. The polyester pellet composition should comprise a majority of a polyester polymer, preferably a polyester polymer present in an amount of at least 80 wt. %, more preferably at least 95 wt. %, and most preferably at least 98 wt. %, based on the weight of polymers (excluding fillers, fibers, impact modifiers, or other polymers which may form a discontinuous phase). The polyester polymer preferably comprises at least 60 wt. % of a polyethylene terephthalate, more preferably at least 90 wt. % of a polyethylene terephthalate, and most preferably 100 wt. % of a polyethylene terephthalate. As noted above, a polyethylene terephthalate polymer contains at least 60 mole % of ethylene terephthalate units. In this embodiment, it is preferred that the polyethylene terephthalate is made from at least 90 mole % terephthalic acid and at least 90 mole % of ethylene glycol.

Typically, polyesters such as polyethylene terephthalate polymer are made by reacting a glycol with a dicarboxylic acid as the free acid or its dimethyl ester to produce a prepolymer compound which is then polycondensed to produce the polyester. If required, the molecular weight of the polyester can then be increased further by solid state polymerization. After melt phase and/or solid state polycondensation the polyesters preferably have an intrinsic viscosity (It.V.) of at least 0.60 dL/g, more preferably at least 0.70 dL/g measured at 25° C. in a 60/40 ratio by weight of phenol/tetrachloroethane.

In addition to units derived from terephthalic acid, the acid component of the present polyester may be modified with units derived from one or more additional dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid".

In addition to units derived from ethylene glycol, the diol component of the present polyester may be modified with units from additional diols including cycloaliphatic diols preferably having 6 to 20 carbon atoms and aliphatic diols preferably having 3 to 20 carbon atoms. Examples of such diols include diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2,5-ethylhexanediol-(1,3), 2,2-diethyl propane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

Polyesters can be prepared by conventional polymerization procedures well-known in the art sufficient to effect esterification and polycondensation. Polyester polycondensation processes include direct condensation of dicarboxylic acid with the diol, ester interchange, and solid state polymerization methods. Typical polyesterification catalysts which may be used include titanium alkoxides, dibutyl tin dilaruate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present.

For example, a mixture of one or more dicarboxylic acids, preferably aromatic dicarboxylic acids, or ester forming derivatives thereof, and one or more diols may be heated in the presence of esterification and/or transesterification catalysts in an esterification zone, optionally with a polycondensation catalyst, at temperatures in the range of about 150° C. to about 300° C., preferably, about 200° C. to about 300° C., and in conventional reactions, typically between about 260° C. to about 300° C., and pressures ranging from atmospheric to about 0.2 mmHg. Normally, the dicarboxylic acid is esterified with the diol(s) at elevated pressure and at a temperature of about 240° C. to about 270° C. Polycondensation reactions are initiated and continued in the melt phase in a prepolymerization zone and finished in the melt phase in a finishing zone, after which polycondensation reactions are continued in the solid state in a solid stating zone. In the prepolymerization zone, molecular weight build up is effected by increasing the temperature from about 260° C. up to about 280° C. and lowering the pressure while excess diol is removed from the mixture. Polycondensation can be continued in a finishing zone in a series of finishing vessels ramped up to higher temperatures until an ItV of about 0.70 dL/g or less is achieved. The catalyst material such as antimony oxide or triacetate may be added to the prepolymerization zone along with phosphorus, cobalt compounds, and colorants, which may optionally be added to the finishing zone. In a typical DMT based process, those skilled in the art recognize that other catalyst material and points of adding the catalyst material and other ingredients vary from a typical direct esterification process. Silicon carbide may be added at any stage in the melt phase, including the esterification, prepolymer, and/or the finishing stages, including at any stages before pelletization. After polycondensation is completed in the melt phase, the polyester is pelletized and transferred to a solid state polymerization vessel, optionally through a crystallizer to prevent the pellets from sticking together in the solid stating zone, to continue polycondensation molecular weight build up and produce pellets having the final desired ItV.

Other components can be added to the composition of the present invention to enhance the performance properties of the polyester polymer. For example, crystallization aids, impact modifiers, surface lubricants, denesting agents, stabilizers, antioxidants, ultraviolet light absorbing agents, metal deactivators, colorants, nucleating agents, acetaldehyde reducing compounds, other reheat rate enhancing aids such as elemental antimony or reduced antimony, carbon black, graphite, black iron oxide, red iron oxide and the like, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition. It is preferable that the present composition be essentially comprised of a blend of thermoplastic polymer and silicon carbide, with only a modifying amount of other ingredients being present.

The method by which the silicon carbide particles are added to the polyester polymer is not limited. Silicon carbide particles can be added to the polymer reactant system, during or after polymerization, to the polymer melt, or to the molding powder or pellets or molten bulk polyester in the injection-molding machine from which the bottle preforms are made or even added to post consumer recycled polyester composition, either by way of pellet/pellet blending, pellet/flake blending, or adding silicon carbide to a melt of the post consumer polyester composition. Silicon carbide may be added to a polyester polymer, preferably polyethylene terephthalate, and fed to an injection molding machine by any method, including feeding the silicon carbide to the molten polymer in the injection molding machine, or combining the silicon carbide with a feed of polyethylene terephthalate to the injection molding machine, either by melt blending or by dry blending pellets. Alternatively, silicon carbide may be added to an esterification reactor, such as with and through the ethylene glycol feed optionally combined with phosphoric acid, a prepolymer reactor, a polycondensation reactor, or to solid pellets in a reactor for solid stating, or at any point in-between these stages. In each of these cases, silicon carbide may be combined with polyethylene terephthalate or its precursors neat, as a concentrate containing polyethylene terephthalate, or diluted with a carrier. The carrier may be reactive to polyethylene terephthalate or non-reactive. The silicon carbide, whether neat or in a concentrate or in a carrier, and the bulk polyester, are preferably dried prior to mixing together. These may be dried in an atmosphere of dried air or other inert gas, such as nitrogen, and if desired, under sub-atmospheric pressure.

In one embodiment, there is provided a concentrate composition comprising silicon carbide in an amount of at least 0.05 wt. %, preferably at least 2 wt. %, and up to about 35 wt. %, preferably up to 20 wt. % and a thermoplastic polymer normally solid at 25° C. and 1 atm such as a polyester, polyolefin, or polycarbonate in an amount of at least 65 wt. % and preferably at least 80 wt. % and up to 99.5 wt % and preferably up to 98 wt. %, each based on the weight of the concentrate composition. The concentrate may be in liquid or solid form. The converter of polymer to preforms has the flexibility of adding silicon carbide to bulk polyester at the injection molding stage continuously or intermittently, in liquid molten form or as a solid blend, and further custom adjusting the amount of silicon carbide contained in the preform by metering the amount of concentrate to fit the end use application and customer requirement.

The concentrate may be made by mixing silicon carbide with a thermoplastic polymer such as polycarbonate, a polyester, or a polyolefin, in a single or twin-screw extruder and optionally compounding with other reheat additives. A preferred polycarbonate is bisphenol A polycarbonate. Preferred polyolefins are polyethylene and polypropylene. Melt temperatures must be at least as high as the melting point of the polymer. For a polyester such as polyethylene terephthalate, the melt temperatures are typically in the range of 260°–310° C. Preferably, the melt compounding temperature is maintained as low as possible. The extrudate may be withdrawn in any form, such as a strand form, and recovered according to the usual way such as cutting.

Preferably, the concentrate is prepared in a similar polyester as used in the final article. However, in some cases it may be advantageous to use another polymer in the concentrate, such as a polyolefin. In the case where a polyolefin/silicon carbide concentrate is blended with the polyester, the polyolefin is incorporated as a nucleator additive for the bulk polyester.

In one embodiment, the concentrate is added to a bulk polyester or anywhere along the different stages for manufacturing polyethylene terephthalate in a manner such that the concentrate is most compatible with the bulk polyester or its precursors. For example, the point of addition or the ItV of the concentrate may be chosen such that the ItV of the polyethylene terephthalate and the ItV of the concentrate are similar, e.g. +/−0.2 ItV measured at 25° C. in a 60/40 wt/wt phenol/tetrachloroethane solution. A concentrate can be made with an ItV ranging from 0.3 to 0.65 dL/g to match the typical ItV of a polyethylene terephthalate under manufacture in the polycondensation stage. Alternatively, a concentrate can be made with an ItV similar to that of solid stated pellets used at the injection molding stage (e.g. ItV from 0.6 to 1.1 dL/g).

Many other ingredients can be added to the concentrate. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art.

The polyester composition of the present invention may be used to form bottle preforms, also known as parisons, which are test tube shaped, generally injection molded or thermoformed articles. The preform comprises the polyester polymer and silicon carbide. The preform preferably comprises silicon carbide particles within the polyester polymer in an amount ranging from 50 ppm to 250 ppm.

The preform is typically heated to about 20° C. above the glass transition temperature of the polymer composition by passing the preform through a bank of quartz infrared heating lamps, positioning the preform in a bottle mold, and then blowing pressurized air through the open end of the mold, and in some cases, stretch blow molding the preform. The resulting bottle comprises the polyester polymer and silicon carbide, preferably silicon carbide particles in an amount ranging from 50 ppm to 250 ppm distributed within a continuous phase of polyester polymer.

A variety of articles can be made from the polyester polymer pellets. Articles include sheet, film, bottles, trays, other packaging, rods, tubes, lids, and injection molded articles. Any type of bottle can be made from the polyester composition of the invention. In one embodiment, there is provided a beverage bottle made from polyethylene terephthalate suitable for holding water. In another embodiment, there is provided a heat set beverage bottle suitable for holding beverages which are hot filled into the bottle.

Crystallization of the preform finish can be performed either to the preform (as in the Yoshino process), to a pre-bottle (as in the Sidel SRCF process outlined in U.S. Pat. No. 5,382,157) or to the actual heat-set bottle. For example, a heat set bottle can be made by placing a preform into a warm or hot mold and stretched into a container. These bottles are typically designed to withstand hot-filling without shrinkage greater than about 1% by volume. It is also desirable, although not required, to achieve a large degree of spherulitic crystallinity in the bottle sidewall in order to resist thermal distortion upon hot-filling of the bottle.

For example, after forming the preform, the preform is transported to a crystallization machine. The preforms are preferably loaded into carriers which shield the bodies of the preforms against exposure to crystallizing heat, but leave the finishes exposed. The carriers, containing the preforms, are passed through the crystallizing machine, where the preform finishes are exposed to infrared energy for a sufficient amount of time to allow the finishes to crystallize. This stage preferably involves exposing at least a portion of the preform finish to radiant heat from lamps in a row of ovens (across a spectrum that may include the IR range) while protecting the body of the preform. The finish is heated to temperatures at which the selected polyester crystallizes rapidly (for PET about 150° C. to about 180° C.). This results in a highly crystalline finish. High levels of crystallinity give dimensional stability to the finish that enable the resulting container to be hot-filled without suffering from thermal distortion in the finish region.

The silicon carbide additive used in the invention not only reduces the coefficient of static friction among the preforms and bottles while maintaining good haze values, but it also functions to enhance the rate of reheating the preforms. Any one or more of these performance characteristics can be adjusted merely by varying the amount of reheat additive used.

The measurement for coefficient of static friction is determined according to the following test method. This test method provides a speed and torque-sensing device capable of measuring the frictional characteristics of plastic bottles or surfaces with cylindrical or complex shapes. Coefficient of static friction is measured by mounting two 2-liter bottles perpendicular and in contact with each other across the bottle centers and rolling one bottle against a static bottle. Each of the mounted bottles is tested within 1 hour of blowing and releasing from the mold. A first rotatable bottle to be tested is screwed into a screw cap that is attached to a motor shaft. A second bottle is screwed into a screw cap that is hinged and connected to a post. The second hinged bottle is allowed to contact the top sidewall of the first bottle at a perpendicular 90° angle to the first rotatable bottle. A cord to which is attached a 500 gram weight is hung around the end of the second hinged bottle distal to the pivot point to which the bottle is attached to the post. A computer command is entered to activate rolling rotation of the first rotatable bottle attached to the motor shaft from a standstill to the fixed speed of 10 rpm. The computer records the output voltage from a torque-sensing motor, such as Model No. 1602-100, Lebow Products Inc., as the motor power is increased in order to reach and maintain a constant speed (10 rpm). This output voltage is proportional to the torque experienced by the bottle as it is rotated at a constant speed, while in contact with the like. In this mode, a tachogenerator that is associated with the torque-sensing motor automatically adjusts the torque in order to maintain a constant speed as bottles are in contact and set in motion from a standstill. The static coefficient of friction is calculated by a computer program using the formula $\mu=(\text{Torque}/R)/F_2$, where Torque is the output of the torque-sensing device, R is the bottle radius, and $F_2=F_1(L_1/L_2)$. Here $F_2$ is the load experienced by bottles at their contact point, $F_1$ is the load or weight applied to the hinged bottle (500 g), $L_1$ is the distance from the hinged bottle pivot point to the point where the weight is applied (12.25 inches) and $L_2$ is the distance from the bottle pivot point and the contact point between the bottles (6.25 inches).

A beneficial feature provided by thermoplastic compositions, preferably polyester compositions, containing silicon carbide is that the coefficient of static friction of bottles made from these compositions is low. In one embodiment, there is provided a polyester pellet composition, a preform, and a bottle made therefrom, containing silicon carbide, preferably silicon carbide particles, having a coefficient of static friction 0.80 or less, preferably 0.50 or less, more preferably 0.40 or less, and most preferably 0.30 or less.

The measurement of bottle sidewall haze is conducted according to the following method. Haze measurements are made in accordance with ASTM D-1003-00 on 4"×4" sections of the bottle sidewalls using a Hazegard Plus Model 4725 or its equivalent with illuminant C, using ASTM D1003, Method A. The cross-sectional thickness of the bottle sidewall to be tested should be made 12.5 mil thick. The same resin formulation used for the manufacture of bottles subjected to destructive haze testing and the bottles subjected to coefficient of static friction tests should be used for the manufacture of preforms subjected to testing for L* color tests.

Polyester polymer compositions and the bottles made therefrom according to the invention have a haze value, as measured on sidewall bottle samples having a cross-sectional thickness of about 12.5 mil, of less than 4.0%, preferably less than 3.0%, more preferably less than 2.2%.

The impact of any additive, including silicon carbide, on the L* color can be judged using the CIE color standard L* values. The L* value is a measure of brightness. This value is measured in accordance with ASTM D-2244-93. Color measurement theory and practice are discussed in greater detail in "Principles of Color Technology", pp.25–66 by John Wiley & Sons, New York (1981) by Fred W. Billmeyer, Jr. Brightness is measured as L* in the CIE 1976 opponent-color scale, with 100% representing a perfect white object reflecting 100% at all wavelengths, or a colorless sample transmitting 100% at all wavelengths. An L* of 100 in a colorless sample would be perfectly transparent, while an L* of 0 in a colorless sample would be opaque. Reference is made to the apparent transparency, since L* is calibrated to respond as the human eye would respond. Generally, additives which are dark in the visible spectrum can be added in only very small quantities because of their negative impact on L*. Thus, it was unexpected that large quantities (e.g. greater than 65 ppm) of the silicon carbide particles, which are black to the eye, could be added to a polyester composition while maintaining an acceptable L* brightness in the preform.

For purposes of measurement, the preform style utilized to determine L* is a standard 2-liter bottle injection molded preform consisting of a cylinder of approximately 6" in length, by 1.25" in diameter, having a single-wall thickness of 154 mil, and a weight of 54 grams. The preform should include a collar and screw neck at the open end. A Hunter-Lab UltraScan XE diffuse/8° spectrophotometer, or its equivalent, standardized in regular transmittance (RTRAN) mode is used to measure L*. The regular transmittance mode measures light that passes directly through the sample. The light source is a D65 illuminant and the observation angle is set to 10°. The preform should be placed directly in front of the lens for the measurement.

L* values for the polyester compositions as measured on bottle preforms discussed herein should generally be greater than 70.0, more preferably at least 75.0, and most preferably 80.0 or more, as measured on a preform sample having a sidewall cross sectional thickness of about 154 mil. Specifying a particular L* brightness does not imply that a preform having a particular sidewall cross-sectional thickness is actually used or is limited to said thickness, but only that in the event the L* is measured, the polyester composition is, for purposes of testing and evaluating the L* of the composition, injection molded to make a perform having at thickness of 154 mil. The same is true for all test methods which specify a particular wall thickness.

Reheat rates, when specified as a preform sidewall skin temperature, are measured according to the following test method. The temperature of the preform is taken prior to introducing the preform into a Sidel 2/3 SBO or its equivalent. This temperature is taken as $T_i$. The preform is introduced into the Sidel or its equivalent at the following settings: overall power at 84%, zone power settings: Z1=90, Z2=50, Z3=50, Z4=80, Z5=80, Z6=65, Z7=55, Z8=50; lamp setup: Bank 1: lamps 1–8 on; Bank 2: lamps 1, 6,7 on; Bank 3: lamps 1–7 on; Ventilation=70%, preblow cam setting at 28, highblow cam setting at 93, preblow pressure at 10 bar, highblow pressure at 40 bar, at a rate of 2400 bottles per hour, and using a preform having a thickness of 154 mil on a 2-liter perform. The final sidewall preform temperature is measured as $T_f$ just before entering the mold.

In one embodiment, the polyester pellet composition containing silicon carbide has a final preform sidewall skin reheat temperature delta of 3° C. or more, preferably 4° C. or more, more preferably 5° C. or more. By a final reheat temperature delta is meant the difference between the final reheat temperature of a polyester sample composition containing silicon carbide and the final reheat temperature of the same composition without any silicon carbide, as measured according to the above test method. There is also provided a preform containing silicon carbide which has a preform sidewall skin final reheat temperature delta of 3° C. or more, preferably 4° C. or more, more preferably 5° C. or more, as measured according to the above test method.

In another embodiment, there is provided a preform having a combination of advantageous properties. Thus, there is provided a preform comprising silicon carbide having a preform sidewall skin final reheat temperature delta of 3° C. or more, more preferably 4° C. or more, most preferably 5° C. or more, an L* rating of 75.0 or more, more preferably 80.0 or more, and haze level of 4.0% or less, preferably 3.0 or less, more preferably 2.5 or less, and most preferably 2.2% or less, as measured according to the above test methods.

There is also provided a polyester composition, and a preform, having a final preform sidewall skin reheat temperature delta of 3° C. or more, more preferably 4° C. or more, most preferably 5° C. or more, a haze value of 4.0% or less, preferably 3.0 or less, more preferably 2.5 or less, and most preferably 2.2% or less, and a coefficient of static friction of 0.8 or less, preferably 0.5 or less, more preferably 0.4 or less, most preferably 0.3 or less.

In each of the above embodiments, the polyester compositions preferably comprise silicon carbide, most preferably silicon carbide.

The present invention is illustrated by the examples below. However, the examples should not be interpreted as a limitation on the present invention.

EXAMPLES

PET1 is a polyethylene terephthalate copolymer modified with 2 mole % isophthalic acid having an intrinsic viscosity of 0.81 +/−0.02 dL/g.

PET2 is a polyethylene terephthalate polymer commercially available from Eastman Chemical Company as 9921W. This product has an intrinsic viscosity of approximately 0.80 +/−0.02 dL/g.

PET3 is a polyethylene terephthalate polymer commercially available from Eastman Chemical Company as CB12 having enhanced reheat properties and an intrinsic viscosity of 0.84 +/−0.02 dL/g.

SC is silicon carbide obtained from Aldrich Chemical having the following characteristics: density 3.230 g/cm$^3$ and −400 mesh particle size.

Example 1

A pellet concentrate was prepared containing 1 percent by weight of SC in PET1. Sixty pounds of 1 weight percent concentrate of SC in a Base PET1 was prepared by reacting dimethyl terephthalate (DMT), ethylene glycol (EG) and dimethyl isophthalate (DMI) in an eighteen gallon stirred pot reactor system. DMT, DMI, EG, 55 ppm manganese (as the acetate), 20 ppm titanium (as the isopropoxide), and the SC additive were charged to the reactor system. The temperature of the reactor's contents was then raised to effect reaction of the DMT, DMI and EG. Methanol was removed from the reactor as a by-product. Once the theoretical volume of methanol had been removed the reactor's temperature set-point was increased from 200° to 220° C. Once the 220° set point was reached, 80 ppm cobalt (as the acetate), 110 ppm phosphorus (as a phosphate ester) and 220 ppm antimony (as the oxide) were charged to the reaction mixture. The reactor's set-point was then increased from 220° to 285° C. The pressure in the reactor was reduced from atmospheric to 1 mmHg over the course of the heat-up period. Once the amperage drain on the agitator motor indicated that the molten polyester had reached the desired viscosity the reactor's contents were extruded via a gear pump into a chilled water trough. The resulting strand of polyester was chopped into cylindrical pellets. The pellets were dried and crystallized prior to being solid state polymerized in a static bed solid stating unit. Solid state polymerization was carried out at 215° C. and with a constant flow of dry nitrogen passing through the pellet bed. Under these conditions the polymer produced in the melt phase reactor required approximately 12 hours to reach the target intrinsic viscosity of 0.81 dL/g.

The product polyester synthesized via the above described processes was then blended with Base PET2 so as to produce approximately thirty pounds of mixture with SC concentrations of 50, 100 and 200 ppm in the resin. The blends were then used to prepare 2-liter bottle preforms. Preform preparation was done using a Husky model XL-160 with an eight cavity mold. Fifty preforms were randomly selected from the center cut of the produced preforms for blowing into bottles. Preforms produced before and after each set of fifty were discarded to prevent contamination by subsequent blends.

The resulting preforms were stretch blown on a SIDEL 2/3 stretch blow molding machine to make 2-liter bottles. The following settings were used for the bottle blowing: overall power at 84%, zone power settings: Z1=90, Z2=50, Z3=50, Z4=80, Z5=80, Z6=65, Z7=55, Z8=50; lamp setup: Bank 1: lamps 1–8 on; Bank 2: lamps 1,6,7 on: Bank 3: lamps 1–7 on; Ventilation=70%, preblow cam setting is 28, highblow cam setting is 93, preblow pressure is 10 bar, highblow pressure is 40 bar, rate is 2400 bottles per hour, and a thickness of 154 mil on a 2 liter preform. The final sidewall preform temperature was measured on each preform just before entering the mold. Based on the results of this preliminary reheat experiment the overall power output was adjusted for each composition such that a constant preform skin temperature of about 110° C. could be obtained in the final bottle making process. For the composition having 50 ppm SC the overall oven power was set at 84% and for the compositions containing 100 and 200 ppm SC the overall oven power was 80%. The bottles were analyzed for coefficient of friction and sidewall haze level, each using the test methods described above.

For comparison purposes, a pellet concentrate containing 1 percent Microtuff AG-609 talc (available from Polar Minerals) instead of SC was prepared in PET1 using the same procedure as described above. The concentrate was diluted in PET2 as described above to give levels of 50, 100, and 200 ppm talc. Preforms and bottles were prepared as described above, except that the overall oven power was 84% in all cases.

Two controls were also evaluated for purpose of determining the level of haze and coefficient of friction in bottles without any additive which functions to reduce the coefficient of static friction. The two controls were PET2 and PET3, as described earlier. Bottles were blown in the manner described above, at an overall oven power of 84%. The test results for silicon carbide and talc are given in Table 1 and plotted in FIG. 2.

TABLE 1

| Reference | Bottle COF Test Results | | | | | Bottle Sidewall Haze % |
|---|---|---|---|---|---|---|
| | 1 | 2 | 3 | 4 | Average | |
| PET2 control | 1.246 | 1.148 | 1.232 | | 1.209 | 1.19 |
| w/ 50 ppm silicon carbide | 0.838 | 0.674 | 0.906 | 0.661 | 0.770 | 1.11 |
| w/ 100 ppm silicon carbide | 0.448 | 0.639 | 0.566 | 0.615 | 0.567 | 1.45 |
| w/ 200 ppm silicon carbide | 0.284 | 0.255 | 0.28 | 0.264 | 0.271 | 2.07 |
| w/ 50 ppm talc | 0.412 | 0.423 | 0.312 | 0.429 | 0.394 | 2.5 |
| w/ 100 ppm talc | 0.269 | 0.271 | 0.235 | 0.337 | 0.278 | 3.64 |
| w/ 200 ppm talc | 0.216 | 0.265 | 0.268 | 0.257 | 0.252 | 5.92 |
| PET3 control | 1.226 | 1.312 | 1.272 | | 1.270 | 1.97 |

The clarity of bottles containing silicon carbide is clearly superior to that of talc, as shown in FIG. 2. FIG. 2 graphically illustrates the much higher rate of increase in haze for samples containing talc compared with those containing silicon carbide as the concentration of additive is increased. Moreover, a highly desirable limit to the % haze is at about 4%. The results indicate that the level of bottle sidewall haze in bottles containing talc reached 4.0% or higher at levels of around 125 ppm talc, while the sidewall bottle haze levels of bottles made with up to 200 ppm of silicon carbide were well below 4%.

Example 2

The purpose for this experiment was to evaluate a wide range of properties obtained by making PET compositions containing silicon carbide, such as whether or not it functions to enhance the reheat rate of a preform, the brightness of the preform as measured by L*, as well as bottle sidewall haze and coefficient of static friction. The reheat rate was measured by the following procedure. The Sidel 2/3 SBO settings were as follows: overall power at 84%, zone power settings: Z1=90, Z2=50, Z3=50, Z4=80, Z5=80, Z6=65, Z7=55, Z8=50; lamp setup: Bank 1: lamps 1–8 on; Bank 2: lamps 1, 6,7 on; Bank 3: lamps 1–7 on; Ventilation=70%, preblow cam setting is 28, highblow cam setting is 93, preblow pressure is 10 bar, highblow pressure is 40 bar, rate is 2400 bottles per hour, and a thickness of 154 mil on a 2 liter preform. The final sidewall preform temperature was measured on each preform just before entering the mold. The preform skin temperature is a measure of the reheat rate of the composition. Once this was completed, bottles were blown for COF and haze testing, using the conditions as stated above, except the overall oven power was adjusted to 80% for compositions containing 100 and 200 ppm SC, so that all preform skin temperatures were equivalent (110° C.).

The results are tabulated in Table 2.

TABLE 2

| PET2 and: | Preform Temperature (deg C.) on Sidel II at 84% oven power | | | | Bottle COF Test Results | | | | | L* | % |
|---|---|---|---|---|---|---|---|---|---|---|---|
| | #1 | #2 | #3 | Average | 1 | 2 | 3 | 4 | Average | | |
| PET2 control | 108.2 | 109.8 | 109.5 | 109.2 | 1.246 | 1.148 | 1.232 | | 1.209 | 84.59 | 1.19 |
| PET2 and: | | | | | | | | | | | |
| 50 ppm SC | 111.2 | 111.2 | 111.4 | 111.3 | 0.838 | 0.674 | 0.906 | 0.661 | 0.770 | 83.34 | 1.11 |
| 100 ppm SC | 113 | 113.2 | 112.9 | 113.0 | 0.448 | 0.639 | 0.566 | 0.615 | 0.567 | 81.96 | 1.45 |
| 200 ppm SC | 114.8 | 114.3 | 114.9 | 114.7 | 0.284 | 0.255 | 0.28 | 0.264 | 0.271 | 79.66 | 2.07 |
| 50 ppm talc | 111.2 | 110.2 | 110.2 | 110.5 | 0.412 | 0.423 | 0.312 | 0.429 | 0.394 | 83.70 | 2.50 |
| 100 ppm talc | 109.8 | 109.9 | 109.8 | 109.8 | 0.269 | 0.271 | 0.235 | 0.337 | 0.278 | 83.30 | 3.64 |
| 200 ppm talc | 110 | 110.2 | 110.3 | 110.2 | 0.216 | 0.265 | 0.268 | 0.257 | 0.252 | 82.02 | 5.92 |

The results from Table 2 demonstrate that silicon carbide also improved the rate at which the preform reheated by a preform sidewall skin final reheat temperature delta of 5° C. at higher loadings of 200 ppm relative to PET2 control which did not contain any additive and relative to preforms containing talc which also did not function to appreciably enhance the reheat rate of the preform. The haze level of silicon carbide samples was improved over those containing talc.

What we claim is:

1. A polyester pellet composition comprising a polyester polymer and silicon carbide.

2. The composition of claim 1, wherein the amount of silicon carbide is within the range of 5 ppm to 1000 ppm, based on the weight of the polyester polymer.

3. The composition of claim 1, wherein the amount of silicon carbide is within the range of 25 ppm to 500 ppm, based on the weight of the polyester polymer.

4. The composition of claim 3, wherein the amount of silicon carbide is within the range of 50 ppm to 250 ppm, based on the weight of the polyester polymer.

5. The composition of claim 3, wherein the silicon carbide is silicon carbide particles.

6. The composition of claim 5, wherein the average particle size of the silicon carbide particles is within a range of 0.01 micron to 40 microns.

7. The composition of claim 6, wherein the average particle size of the silicon carbide particles is within a range of 0.4 micron to 12 microns.

8. The composition of claim 1, wherein silicon carbide is added to a post consumer recycle polyethylene terephthalate composition.

9. The composition of claim 1, wherein the degree of porosity of the silicon carbide ranges from 0.0 to 30%.

10. The composition of claim 9, wherein the degree of porosity ranges from 0.0 to 5.0%.

11. The composition of claim 1, wherein the silicon carbide has a thermal conductivity of at least 80 W/mK.

12. The composition of claim 1, wherein the chemical purity of silicon carbide is in excess of 99.99%.

13. The composition of claim 1, wherein the composition comprises at least 98 wt % polyester polymer, and the polyester polymer comprises polyethylene terephthalate containing at least 90 mole % ethylene terephthalate units.

14. The composition of claim 1, comprising silicon carbide particles, wherein the composition has a coefficient of static friction of 0.5 or less.

15. The composition of claim 1, comprising silicon carbide particles, wherein the composition has a coefficient of static friction of 0.4 or less.

16. The composition of claim 1, comprising silicon carbide particles, wherein the composition has a coefficient of static friction of 0.3 or less.

17. The composition of claim 1, comprising from 50 to 250 ppm silicon carbide particles, wherein the composition has a haze value of 4.0% or less.

18. The composition of claim 1, comprising from 50 to 250 ppm silicon carbide particles, wherein the composition has a haze value of 3.0% or less.

19. The composition of claim 1, comprising from 50 to 250 ppm silicon carbide particles, wherein the composition has a haze value of 2.5% or less.

20. A preform comprising a polyester polymer and silicon carbide.

21. The preform of claim 20, wherein the amount of silicon carbide is within the range of 5 ppm to 1000 ppm, based on the weight of the polyester polymer.

22. The preform of claim 20, wherein the amount of silicon carbide is within the range of 25 ppm to 500 ppm, based on the weight of the polyester polymer.

23. The preform of claim 20, wherein the amount of silicon carbide is within the range of 50 ppm to 250 ppm, based on the weight of the polyester polymer.

24. The preform of claim 23 wherein the silicon carbide is silicon carbide particles.

25. The preform of claim 24, wherein the average particle size of the silicon carbide particles is within a range of 0.01 micron to 40 microns.

26. The preform of claim 25, wherein the average particle size of the silicon carbide particles is within a range of 0.4 micron to 12 microns.

27. The preform of claim 26, wherein the polyester polymer comprises at least 98 wt % polyester polymer, and the polyester polymer comprises polyethylene terephthalate containing at least 90 mole % ethylene terephthalate units.

28. The preform of claim 20, wherein the degree of porosity of the silicon carbide ranges from 0.0 to 30%.

29. The preform of claim 28, wherein the degree of porosity ranges from 0.0 to 5.0%.

30. The preform of claim 20, wherein the silicon carbide has a thermal conductivity of at least 80 W/mK.

31. The preform of claim 20, wherein the chemical purity of silicon carbide is in excess of 99.99%.

32. The preform of claim 20, wherein the composition comprises at least 98 wt % polyester polymer, and the polyester polymer comprises polyethylene terephthalate containing at least 90 mole % ethylene terephthalate units.

33. The preform of claim 32, comprising silicon carbide particles, wherein the preform has a coefficient of static friction of 0.5 or less.

34. The preform of claim 33, comprising silicon carbide particles, wherein the preform has a coefficient of static friction of 0.4 or less.

35. The preform of claim 34, comprising silicon carbide particles, wherein the preform has a coefficient of static friction of 0.3 or less.

36. The preform of claim 20, comprising from 50 to 250 ppm silicon carbide particles, wherein the preform has a haze value of 4.0% or less and a coefficient of static friction of 0.3 or less.

37. The preform of claim 20, comprising from 50 to 250 ppm silicon carbide particles, wherein the preform has a haze value of 3.0% or less.

38. The preform of claim 37, comprising from 50 to 250 ppm silicon carbide particles, wherein the preform has a haze value of 2.5% or less.

39. The preform of claim 32, comprising silicon carbide particles in a quantity within the range of 50 to 400 ppm silicon carbide particles, wherein the preform has a preform sidewall skin final reheat temperature delta of 3° C. or more, an L* rating of 75.0 or more, and haze level of 4.0% or less.

40. The preform of claim 39, wherein the preform has a preform sidewall skin final reheat temperature delta of 4° C. or more, and haze level of 3.0% or less.

41. The preform of claim 40, wherein the preform has a preform sidewall skin final reheat temperature delta of 4° C. or more, and haze level of 3.0% or less.

42. The preform of claim 40, wherein the preform has a preform sidewall skin final reheat temperature delta of 5° C. or more, and haze level of 2.5% or less.

43. The preform of claim 32, wherein the preform has a final preform sidewall skin reheat temperature delta of 3° C. or more, a haze value of 4.0% or less, and a coefficient of static friction of 0.8 or less.

44. The preform of claim 32, wherein the preform has a final preform sidewall skin reheat temperature delta of 4° C. or more, a haze value of 2.5% or less, and a coefficient of static friction of 0.3 or less.

45. A bottle comprising a polyester polymer and silicon carbide.

46. The bottle of claim 45, wherein the amount of silicon carbide is within the range of 5 ppm to 1000 ppm, based on the weight of the polyester polymer.

47. The bottle of claim 46, wherein the amount of silicon carbide is within the range of 25 ppm to 400 ppm, based on the weight of the polyester polymer.

48. The bottle of claim 47, wherein the amount of silicon carbide is within the range of 50 ppm to 250 ppm, based on the weight of the polyester polymer.

49. The bottle of claim 48 wherein the silicon carbide is silicon carbide particles.

50. The bottle of claim 49, wherein the average particle size of the silicon carbide particles is within a range of 0.01 micron to 40 microns.

51. The bottle of claim 50, wherein the average particle size of the silicon carbide particles is within a range of 0.4 micron to 12 microns.

52. The bottle of claim 51, wherein the polyester polymer comprises at least 98 wt % polyester polymer, and the polyester polymer comprises polyethylene terephthalate containing at least 90 mole % ethylene terephthalate units.

53. The bottle of claim 45, wherein the degree of porosity of the silicon carbide ranges from 0.0 to 30%.

54. The bottle of claim 53, wherein the degree of porosity ranges from 0.0 to 5.0%.

55. The bottle of claim 45, wherein the silicon carbide has a thermal conductivity of at least 80 W/mK.

56. The bottle of claim 45, wherein the chemical purity of silicon carbide is in excess of 99.99%.

57. The bottle of claim 45, wherein the composition comprises at least 98 wt % polyester polymer, and the polyester polymer comprises polyethylene terephthalate containing at least 90 mole % ethylene terephthalate units.

58. The bottle of claim 57, comprising silicon carbide particles, wherein the bottle has a coefficient of static friction of 0.4 or less.

59. The bottle of claim 58, comprising silicon carbide particles, wherein the bottle has a coefficient of static friction of 0.3 or less.

60. The bottle of claim 57, comprising from 50 to 250 ppm silicon carbide particles, wherein the bottle has a haze value of 4.0% or less and a coefficient of static friction of 0.3 or less.

61. The bottle of claim 57, comprising from 50 to 250 ppm silicon carbide particles, wherein the bottle has a haze value of 3.0% or less.

62. The bottle of claim 61, comprising from 50 to 250 ppm silicon carbide particles, wherein the bottle has a haze value of 2.5% or less.

63. The bottle of claim 57, comprising silicon carbide particles in a quantity within the range of 50 to 400 ppm silicon carbide particles, wherein the bottle has a preform sidewall skin final reheat temperature delta of 3° C. or more, an L* rating of 75.0 or more, and haze level of 4.0% or less.

64. The bottle of claim 63, wherein the bottle has a preform sidewall skin final reheat temperature delta of 4° C. or more, and haze level of 3.0% or less.

65. The bottle of claim 64, wherein the bottle has a preform sidewall skin final reheat temperature delta of 4° C. or more, and haze level of 3.0% or less.

66. The bottle of claim 65, wherein the bottle has a preform sidewall skin final reheat temperature delta of 5° C. or more, and haze level of 2.5% or less.

67. The bottle of claim 57, wherein The bottle has a final preform sidewall skin reheat temperature delta of 3° C. or more, a haze value of 4.0% or less, and a coefficient of static friction of 0.8 or less.

68. The bottle of claim 67, wherein The bottle has a final preform sidewall skin reheat temperature delta of 4° C. or more, a haze value of 2.5.0% or less, and a coefficient of static friction of 0.3 or less.

69. A process for manufacturing an injection molded polyester composition, comprising adding a solid or liquid concentrate comprising silicon carbide and polyethylene terephthalate to bulk polyethylene terephthalate at a point after melt phase polymerization of the bulk polyethylene terephthalate and before or at injection molding the polyester composition.

70. The process of claim 69, comprising dry blending the concentrate with bulk polyethylene terephthalate.

71. The process of claim 69, comprising adding the concentrate at the injection molding stage.

72. The process of claim 69, comprising injection molding preforms comprising from 50 to 400 ppm silicon carbide particles.

73. A process for manufacturing a polyester composition, comprising adding silicon carbide as a concentrate or neat or in a carrier to a melt phase for the manufacture of polyethylene terephthalate.

74. The process of claim 73, comprising adding silicon carbide to an esterification reactor.

75. The process of claim 73, comprising adding silicon carbide to a prepolymer reactor.

76. The process of claim 73, comprising adding silicon carbide to a polycondensation reactor.

77. The process of claim 73, comprising adding silicon carbide at a point between an esterification reactor and a prepolymer reactor, or at a point between a prepolymer reactor and a polycondensation reactor, or at a point between a polycondensation reactor and solid stating zone.

78. The process of claim 73, comprising silicon carbide particles.

79. A process for manufacturing a polyester composition, comprising adding silicon carbide particles to a melt phase during the polymerization of polyethylene terephthalate and feeding the molten polyethylene terephthalate to an injection molding machine for the manufacture of a preform.

80. An isolated concentrate composition comprising silicon carbide in an amount ranging from 0.05 wt. % to about 35 wt. % and a thermoplastic polymer normally solid at 25° C. and 1 atmosphere in an amount ranging from at least 65 wt. % up to 99.95 wt. %, each based on the weight of the concentrate composition.

81. The concentrate of claim 80, wherein the thermoplastic composition comprises polyethylene terephthalate.

82. The concentrate of claim 81, comprising silicon carbide particles in an amount ranging from at least 2 wt. % and up to 20 wt. % and from 80 wt. % up to 98 wt. % polyethylene terephthalate.

83. The concentrate of claim 81, wherein the concentrate is in solid form.

84. The concentrate of claim 80, comprising adding a concentrate, having an ItV, to a melt phase for the manufacture of a polyethylene terephthalate, having an ItV, wherein the ItV of the added concentrate and the ItV of the polyethylene terephthalate in the melt phase at the point where the concentrate is added are within +/−0.2 ItV.

85. The concentrate of claim 80, comprising adding the concentrate to bulk polyethylene terephthalate in an amount such that the concentration of silicon carbide in the polyethylene terephthalate ranges from 50 ppm to 400 ppm.

* * * * *